(12) United States Patent
Wu et al.

(10) Patent No.: US 8,503,725 B2
(45) Date of Patent: Aug. 6, 2013

(54) VEHICLE TRACKING SYSTEM AND TRACKING METHOD THEREOF

(75) Inventors: Bing-Fei Wu, Hsinchu (TW); Yen-Lin Chen, Kaohsiung (TW); Hao-Yu Huang, Kaohsiung (TW); Chung-Jui Fan, Taipei County (TW)

(73) Assignee: National Chiao Tung University, Hsinchu (TW)

( * ) Notice: Subject to any disclaimer, the term of this patent is extended or adjusted under 35 U.S.C. 154(b) by 333 days.

(21) Appl. No.: 12/905,576

(22) Filed: Oct. 15, 2010

(65) Prior Publication Data

US 2011/0255740 A1 Oct. 20, 2011

(30) Foreign Application Priority Data

Apr. 15, 2010 (TW) ................................ 99111933 A

(51) Int. Cl.
*G06K 9/00* (2006.01)
(52) U.S. Cl.
USPC .......................................................... 382/103
(58) Field of Classification Search
None
See application file for complete search history.

(56) References Cited

PUBLICATIONS

Yen-Lin Chen; Bing-Fei Wu; Chung-Jui Fan; , "Real-time vision-based multiple vehicle detection and tracking for nighttime traffic surveillance," Systems, Man and Cybernetics, 2009. SMC 2009. IEEE International Conference on , vol., No., pp. 3352-3358, Oct. 11-14, 2009.*

* cited by examiner

*Primary Examiner* — Nirav G Patel
(74) *Attorney, Agent, or Firm* — WPAT, P.C.; Anthony King

(57) ABSTRACT

The present invention discloses a vehicle tracking system and method, and the tracking method comprises the steps of capturing a bright object from an image by the bright object segmentation; labeling the bright object by a connected component labeling method and forming a connected component object; identifying, analyzing and combining the characteristics of the connected component object to form a lamp object by the bright object recognition; tracking the trajectory of the lamp object by a multi-vehicle tracking method; and identifying the type of a vehicle having the lamp object by the vehicle detection/recognition and counting the number of various vehicles.

10 Claims, 27 Drawing Sheets

VEHICLE TRACKING SYSTEM AND TRACKING METHOD THEREOF

BACKGROUND OF THE INVENTION

1. Field of the Invention

The present invention generally relates to a vehicle tracking system and a vehicle tracking method, and more particularly to a vehicle tracking system and method used for tracking a vehicle at nighttime.

2. Description of the Related Art

Present existing vehicle detection technologies include the methods of using the properties of edges, moving profiles, background convergence or corners to extract the characteristics of the appearance of a vehicle. However, the light at nighttime or a dark place is relatively non-uniform, so that the aforementioned methods cannot be applied in the environment of roads at night time effectively. With reference to FIGS. 1 to 3 for schematic views of a conventional way of detecting vehicles, the result of the edge detection can be observed in the image, and the detected objects on a road surface include automobile lamps, road surface glares, road markings and signs, etc. FIG. 1 shows typical nighttime traffic scenes from an urban road and highway under different environmental illumination conditions. These figures depict that, in typical nighttime traffic scenes, there are moving cars and motorbikes on the road, and under poorly or brightly environmental illuminated conditions, vehicle lights are the only valid salient features. In addition, lamps, traffic lights, and signs are also visible sources of illumination in the image sequences of nighttime traffic scenes. In FIG. 2, the difference between two successive images is used for obtaining a moving profile, and the moving profile is still primarily based on the lamp. In FIG. 3, the background of an image can be obtained by background convergence, and the difference between the original image and the background is used for detecting a foreground object, wherein an image with a higher setting minus the threshold value is used to extract the characteristics of an object which is basically a lamp. In summary, a lamp is a major characteristic of the road environment at nights, regardless of which method is used for extracting the object. Therefore, it is very important to provide a vehicle tracking system that uses a lamp as a basis to overcome the technical issue of the conventional vehicle detection technology that cannot be operated effectively at night time.

SUMMARY OF THE INVENTION

In view of the shortcomings of the conventional vehicle tracking system and method, it is a primary objective of the invention to overcome the problems by providing a vehicle tracking system and a tracking method thereof that can be used for detecting vehicles at night time.

To achieve the aforementioned objective, the present invention provides a vehicle tracking method, comprising the steps of: capturing a plurality of bright objects from an image by the bright object segmentation; labeling coordinates of the plurality of bright objects by a connected component object labeling method to form a plurality of connected component objects; identifying, analyzing and combining characteristics of the plurality of connected component objects by the bright object recognition to form a plurality of lamp objects; and identifying the type of a vehicle having the plurality of lamp objects by the vehicle detection/recognition, and counting the number of various vehicles.

Wherein, the image is a grey-scale image, and the bright object segmentation determines a plurality of threshold values by a grey scale statistical chart of the grey-scale image. The bright object segmentation further segments the image to form the plurality of bright objects after objects with the same nature and similar characteristics in the grey-scale image are determined according to the plurality of threshold values.

Wherein, the plurality of lanes in the image defines a detection area, and the connected component object labeling method includes a coarse scan and a fine scan for labeling the plurality of adjacent bright objects as the same object by a connected component labeling method to form the plurality of connected component objects.

Wherein, the bright object recognition respectively compares values of aspect ratio, area and density of the plurality of connected component objects with a maximum aspect ratio threshold value, a minimum aspect ratio threshold value, a maximum area threshold value, a minimum area threshold value and a density critical threshold value to determine the characteristics of the plurality of connected component objects to capture the plurality of lamp objects. If the bright object recognition determines that any paired connected component objects have a horizontal distance and a vertical distance smaller than a horizontal distance threshold value and a vertical distance threshold value respectively, then the paired connected component objects are combined into a lamp object.

Wherein, the multi-vehicle tracking method tracks the projectory of the plurality of lamp objects. If the values of area, width and horizontal distance of any paired lamp objects match a lamp area threshold value, a lamp width threshold value and a lamp horizontal distance threshold value respectively, the multi-vehicle tracking method combines the paired lamp objects into one of the lamp objects, and tracks the projectory of the lamp object.

Wherein, the vehicle detection/recognition compares the aspect ratio of the plurality of lamp objects with the aspect ratio threshold value of a motorcycle and the aspect ratio threshold value of an automobile, and determines the type of a vehicle having the plurality of lamp objects according a comparison result.

To achieve the aforementioned objective, the present invention further provides a vehicle tracking system comprising an image capture module, a display module and a processing module. The image capture module is provided for capturing an image; the display module is provided for displaying the image. The processing module comprises a bright object segmentation unit, a connected component object labeling unit, a bright object identifying unit, a multi-vehicle tracking unit, and a vehicle identifying unit. The bright object segmentation unit is provided for capturing a plurality of bright objects from an image; the connected component object labeling unit is provided for labeling coordinates of the plurality of bright objects to form a plurality of connected component objects; the bright object identifying unit is provided for identifying, analyzing and combining characteristics of the plurality of connected component objects; the multi-vehicle tracking unit is provided for tracking the trajectory of the plurality of lamp objects; the vehicle identifying unit is provided for identifying the type of a vehicle having the plurality of lamp objects. The processing module further counts the number of various vehicles and controls the number of various vehicles displayed by the display module.

Wherein, the image is a grey-scale image, and the bright object segmentation unit determines a plurality of threshold values by a grey scale statistical chart of the grey-scale image. The bright object segmentation unit further segments the image to form the plurality of bright objects after objects of the same nature and similar characteristics in the grey-scale image are determined according to the plurality of threshold values.

Wherein, the plurality of lanes in the image defines a detection area, and the connected component object labeling unit includes a coarse scan and a fine scan for labeling the plurality of adjacent bright objects as the same object by a connected component labeling unit to form the plurality of connected component objects.

Wherein, the bright object identifying unit respectively compares the values of aspect ratio, area and density of the plurality of connected component objects with a maximum aspect ratio threshold value, a minimum aspect ratio threshold value, a maximum area threshold value, a minimum area threshold value and a density critical threshold value to determine the characteristics of the plurality of connected component objects to capture the plurality of lamp objects. When the bright object recognition determines that any two of the connected component objects have a horizontal distance and a vertical distance smaller than a horizontal distance threshold value and a vertical distance threshold value respectively, then the two connected component objects are combined into a lamp object.

Wherein, the multi-vehicle tracking unit tracks the projectory of the plurality of lamp objects; and if the values of area, width and horizontal distance of any paired lamp objects match a lamp area threshold value, a lamp width threshold value and a lamp horizontal distance threshold value respectively, the multi-vehicle tracking method combines the paired lamp objects into one of the lamp objects, and tracks the projectory of the lamp object.

Wherein, the vehicle identifying unit compares the aspect ratio of the plurality of lamp objects with a motorcycle aspect ratio threshold value and an automobile aspect ratio threshold value, and determines the type of a vehicle having the plurality of lamp objects according a comparison result.

In conclusion, the vehicle tracking system and method of the present invention have one or more of the following advantages:

(1) The vehicle tracking system and method can segment the lamp image for the image processing in order to improve the accuracy of detecting the vehicles at night time.

(2) The vehicle tracking system and method can track many lamps by using a single lamp as a basis. Additionally, the proposed method can overcome the difficulty of identifying the vehicles at night time.

DETAILED DESCRIPTION OF THE PREFERRED EMBODIMENTS

The technical characteristics of the present invention will become apparent with the detailed description of preferred embodiments and the illustration of related drawings as follows.

Figure 4:
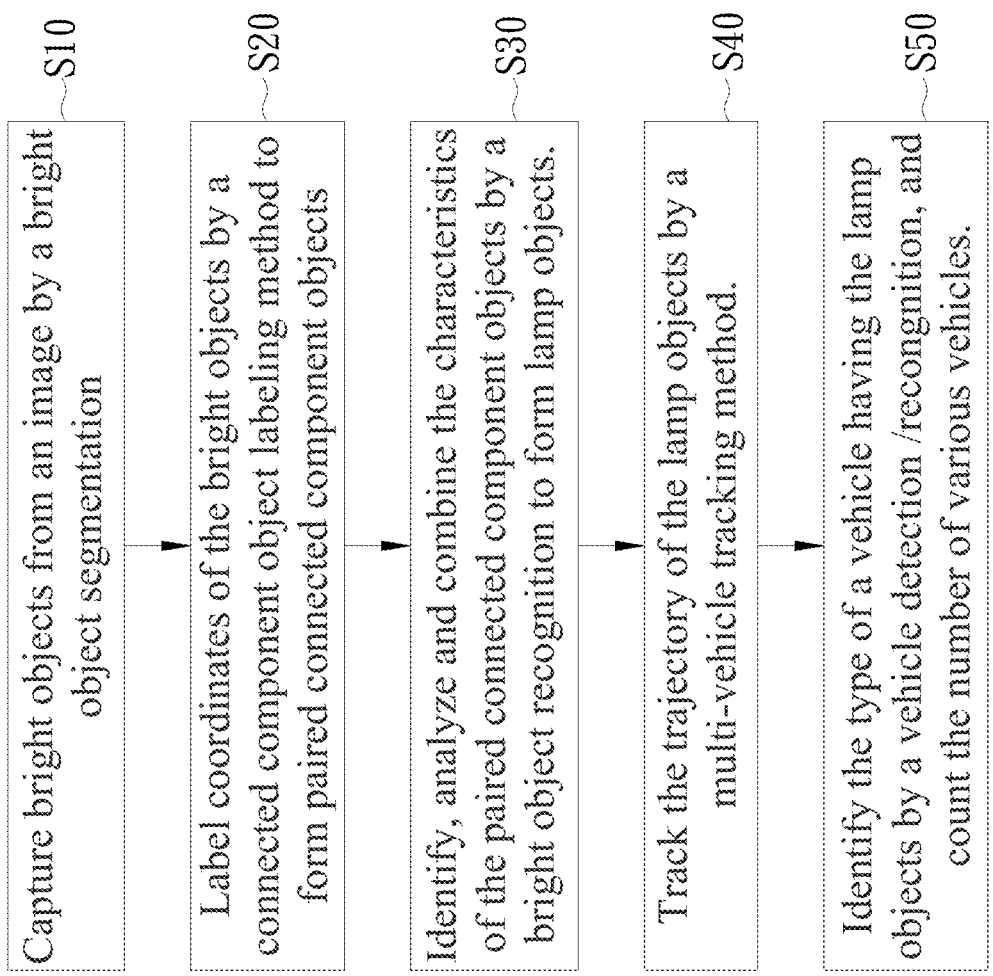
FIG. 4 is a flow chart of a vehicle tracking method of the present invention.

With reference to FIG. 4 for a flow chart of a vehicle tracking method of the present invention, the vehicle tracking method comprises the steps of: (S10) capturing a plurality of bright objects from an image by the bright object segmentation; (S20) labeling coordinates of the plurality of bright objects by a connected component object labeling method to form a plurality of connected component objects; (S30) identifying, analyzing and combining the characteristics of the plurality of connected component objects by the bright object recognition to form a plurality of lamp objects; (S40) tracking a trajectory of the plurality of lamp objects by a multi-vehicle tracking method; (S50) identifying the type of a vehicle having the plurality of lamp objects by the vehicle detection/recognition, and counting the number of various vehicles.

Figure 5:
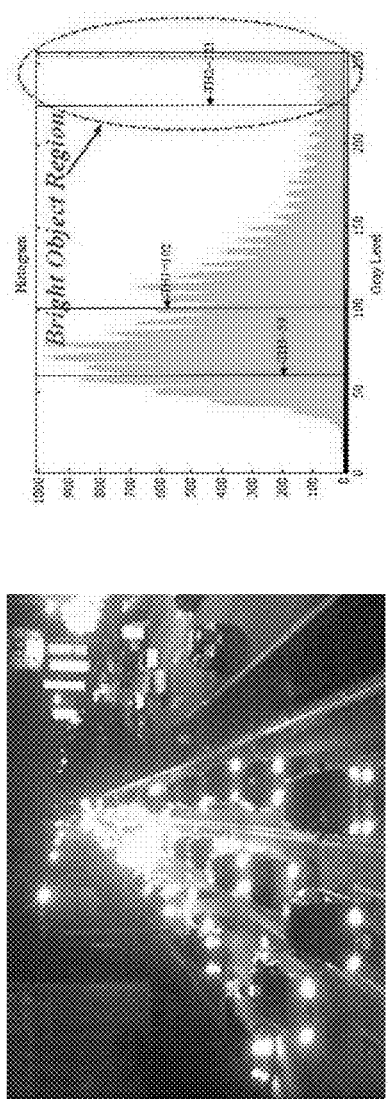
FIG. 5 is a schematic view which illustrates the bright object segmentation of a vehicle tracking method in accordance with a first preferred embodiment of the present invention.
Figure 6:
FIG. 6 is a schematic view which illustrates the bright object segmentation of a vehicle tracking method in accordance with a second preferred embodiment of the present invention.
Figure 6:
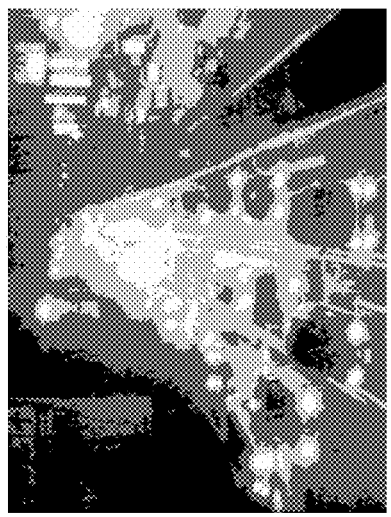
Figure 7:
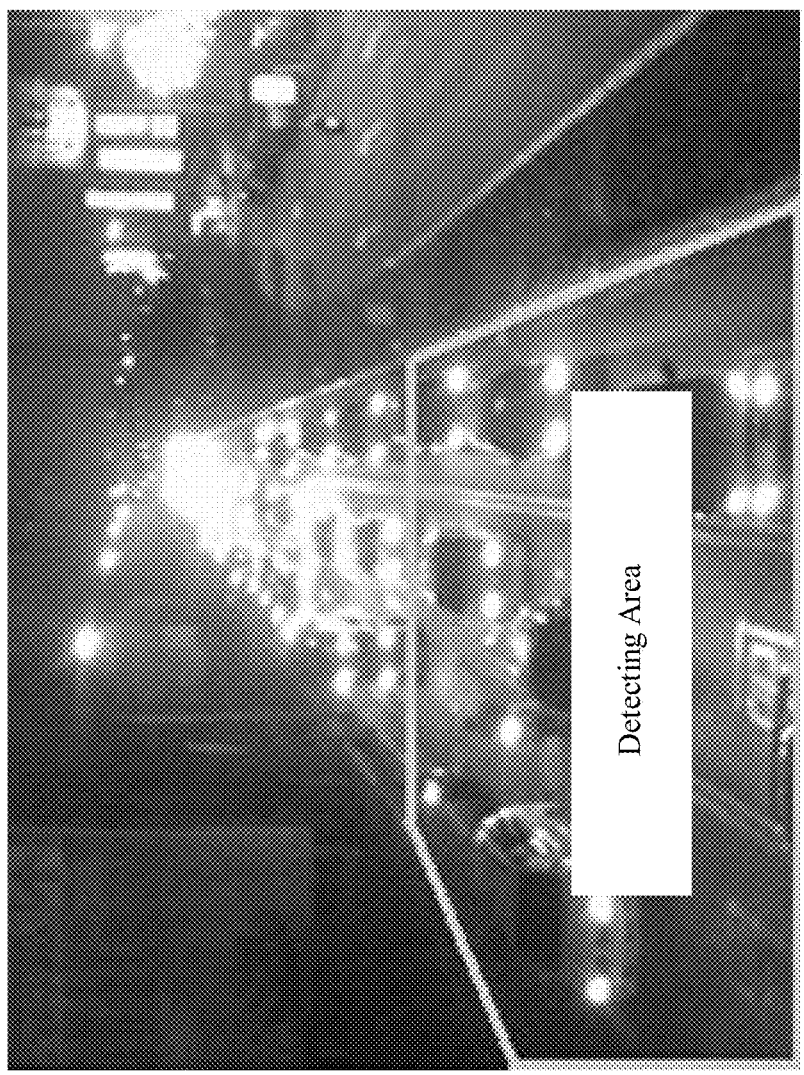
FIG. 7 is a schematic view of a detecting area in a vehicle tracking method of the present invention.
Figure 8:
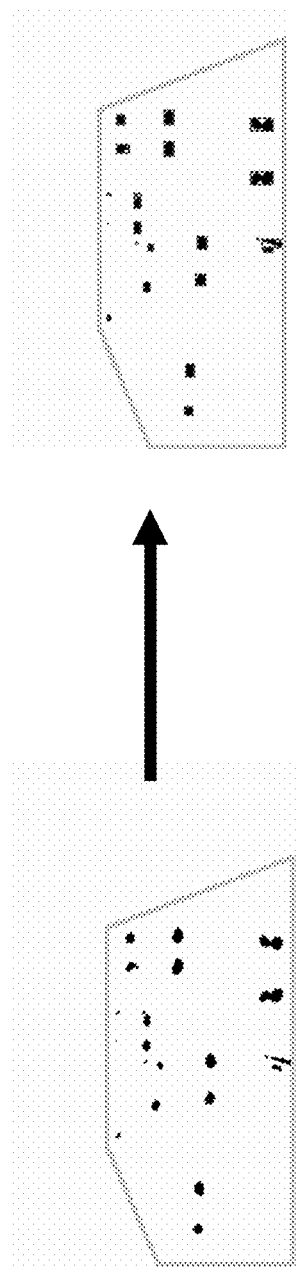
FIG. 8 is a schematic view which implements a connected component object labeling method in a vehicle tracking method of the present invention.

The image is a grey-scale image (as shown on the left side of FIG. 5), and the bright object segmentation determines a plurality of threshold values through a grey scale statistical chart (as shown on the right side of FIG. 5) of the grey-scale image. The bright object segmentation further segments the image into bright objects (as shown on the right side of FIG. 6) after the objects (as shown on the left side of FIG. 6) with same nature and similar characteristics in the grey-scale image are determined according to the threshold values. The image includes a plurality of lanes, and the lanes define a detection area (as shown in FIG. 7). The connected component object labeling method includes a coarse scan and a fine scan for labeling a plurality of adjacent bright objects as the same object by a connected component labeling method to form a plurality of connected component objects (as shown in FIG. 8).

The present invention discloses a fast bright-object segmentation process based on automatic multilevel histogram thresholding. The proposed method extracts the bright object pixels of moving vehicles from image sequences of nighttime traffic scenes.

The first step in the bright object extraction process is to extract bright objects from the road image to facilitate subsequent rule-based classification and tracking processes. To reduce the computational complexity of extracting bright objects, the present invention first extracts the grayscale image, i.e. the Y-channel, of the grabbed image by performing a RGB to Y transformation. To extract bright objects from a given transformed gray-intensity image, the pixels of bright objects must be separated from other object pixels of different illuminations. For this purpose, the present invention discloses a fast effective multilevel thresholding technique. In the preferred embodiments, this effective multilevel thresholding technique is applied to automatically determine the appropriate levels of segmentation for extracting bright object regions from traffic-scene image sequences.

Figure 1:
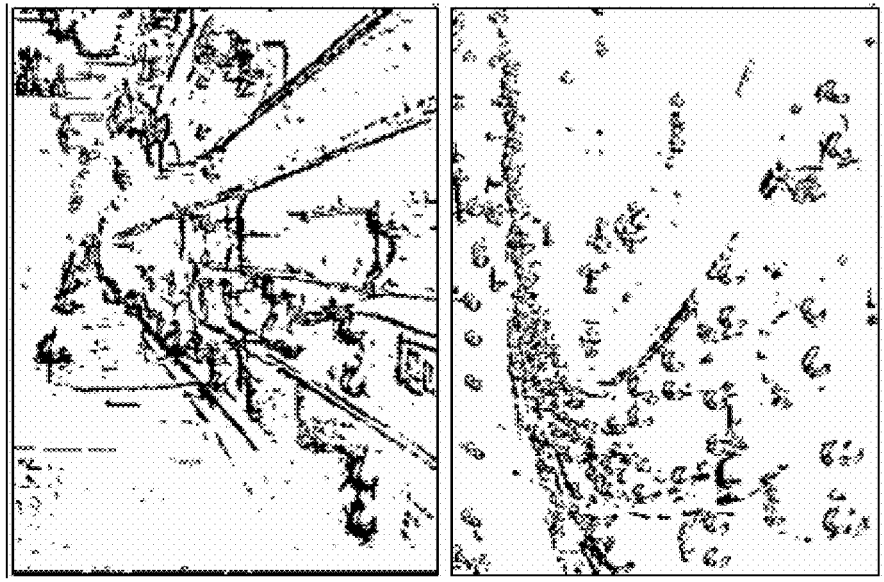
FIG. 1 is a schematic view of a conventional way of detecting vehicles by edges.
Figure 1:
Figure 1:
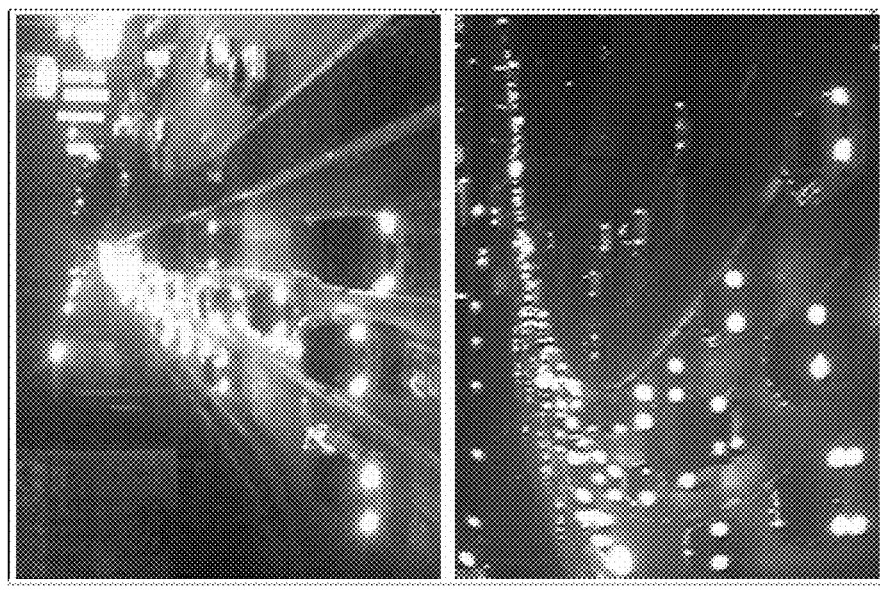
Figure 2:
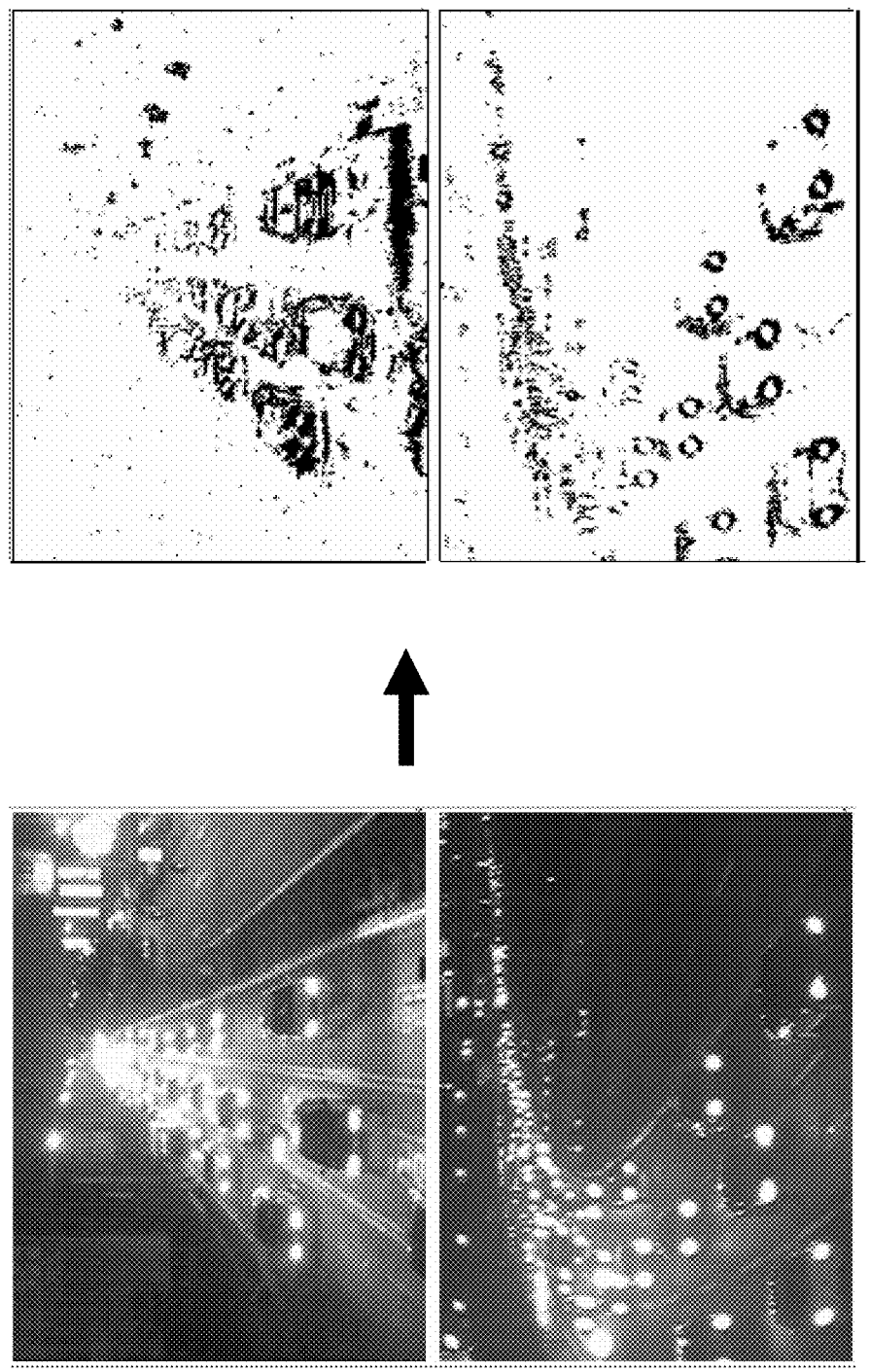
FIG. 2 is a schematic view of a conventional way of detecting vehicles by moving profiles.
Figure 3:
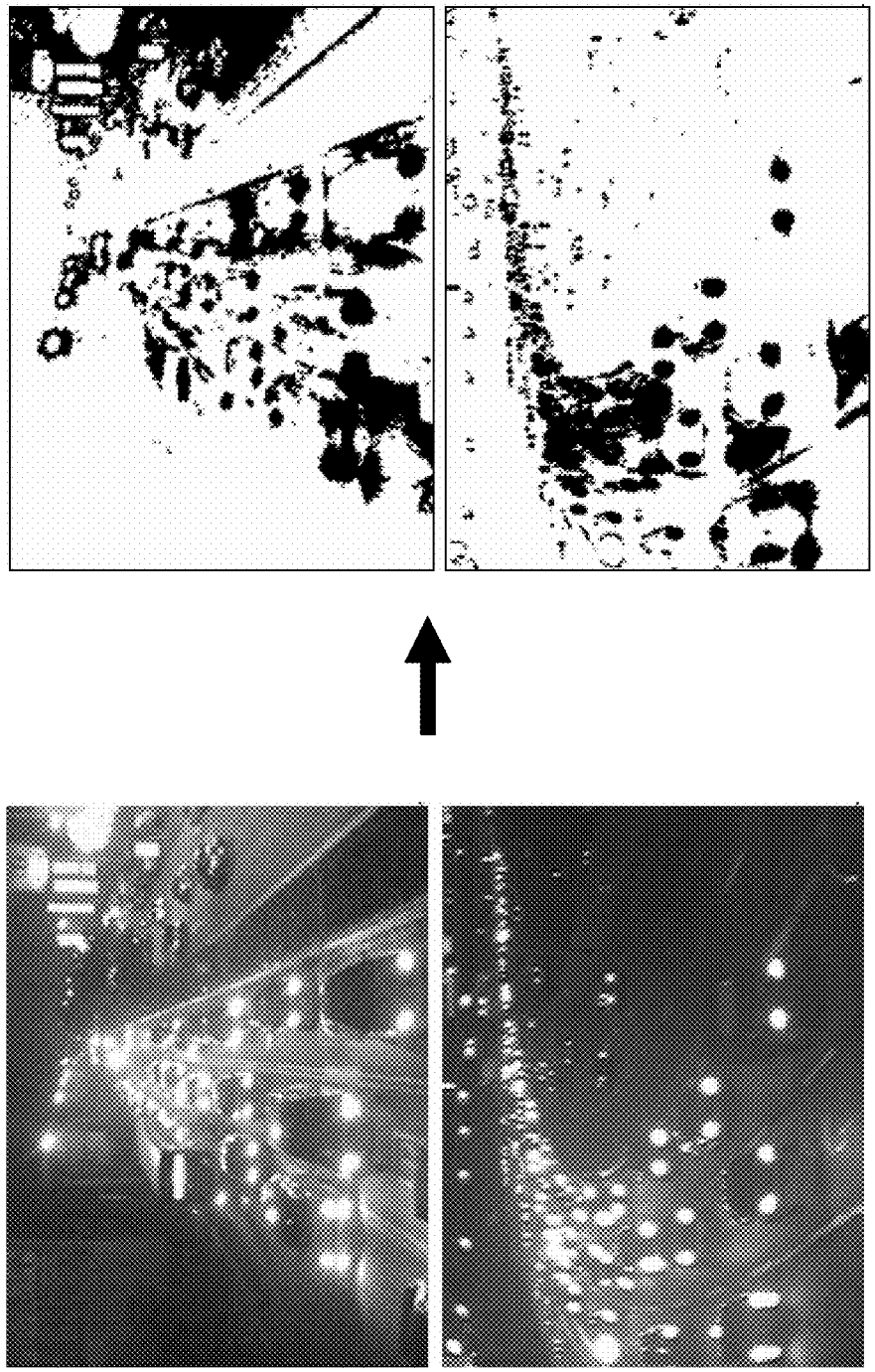
FIG. 3 is a schematic view of a conventional way of detecting vehicles by background convergence.

By applying this multilevel thresholding technique, the lighting object regions of moving vehicles can be efficiently and adaptively segmented under various environmental illumination conditions in different nighttime traffic scenes as shown on the left part of FIGS. 1 to 3. As a result, lighting objects can be appropriately extracted from other objects contained in nighttime traffic scenes. Accordingly, as shown on the right part of FIG. 3, performing this lighting object segmentation process successfully separates the lighting objects of interest on the left part of FIGS. 1 to 3 into threshold object planes under different environmental illumination conditions in nighttime traffic scenes.

To extract obtain potential vehicle light components from the detection zone in the bright object plane, the connected-component extraction process can be performed to label and locate the connected-components of the bright objects. Extracting the connected-components reveals the meaningful features of location, dimension, and pixel distribution associated with each connected-component. The location and dimension of a connected-component can be represented by the bounding box surrounding it.

Since various non-vehicle light components, such as traffic lamps, road signs, road reflector plates, reflected beams, and some other illuminant objects, coexist with actual vehicle lights, we applied a spatial classification process to preliminarily detect potential vehicle lights and filter out non-vehicle components. These detected potential vehicle lights are then processed by the following vehicle light tracking and identification process to identify the actual moving vehicles.

To preliminarily screen out non-vehicle illuminating objects, such as street lamps and traffic lights located at the top side of traffic scenes, and to effectively and rapidly locate the sufficiently reliable and clear features of moving vehicles, and efficiently save the redundant computational costs for the embedded system implementation, a detection area is applied for each traffic scene. This detection area is the midline of the traffic scene image, and bounded by the most left and right lanes, as shown in FIG. 7. These lane boundaries were determined by performing a lane detection process in the system initialization. The connected-component extraction and spatial classification processes are only performed on the bright objects located in the detection area, as shown in FIG. 6.

Figure 9:
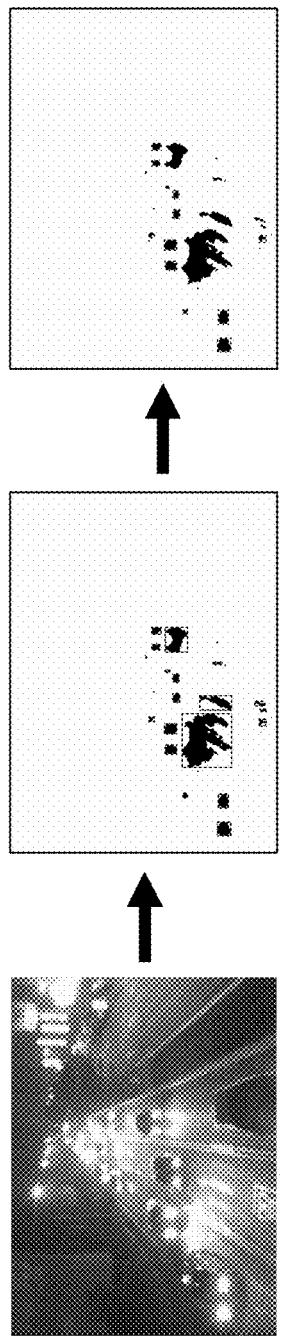
FIG. 9 is a schematic view which implements the bright object recognition in a vehicle tracking method of the present invention.
Figure 10:
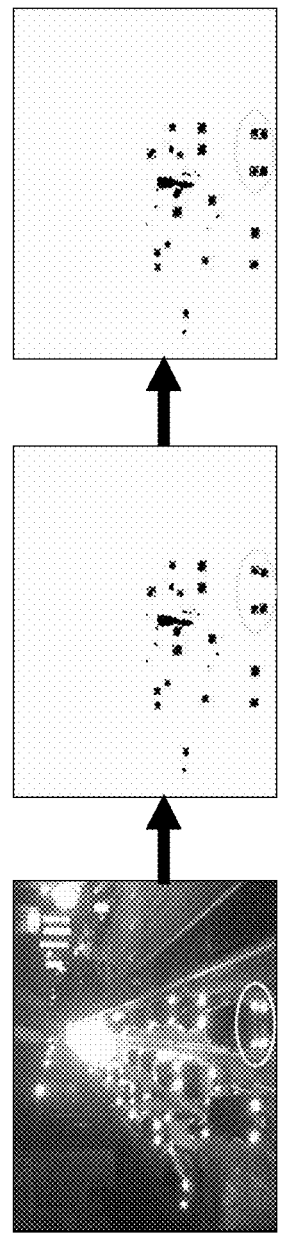
FIG. 10 is a schematic view which combines connected component objects in the bright object recognition of a vehicle tracking method of the present invention.
Figure 11:
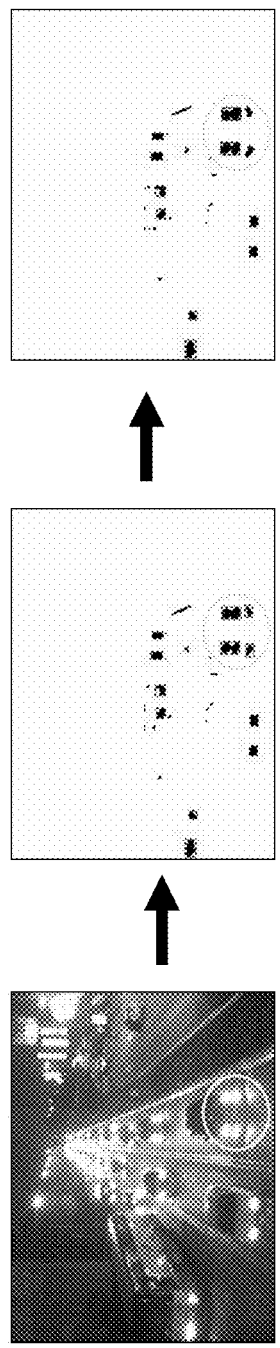
FIG. 11 is a schematic view which eliminates ground reflection in the bright object recognition of a vehicle tracking method in accordance with a preferred embodiment of the present invention.

Please refer to FIG. 9, which is a schematic view of implementing the bright object recognition in a vehicle tracking method according to the present invention. The bright object recognition compares the values of aspect ratio, area and density of the connected component object with a maximum aspect ratio threshold value, a minimum aspect ratio threshold value, a maximum area threshold value, a minimum area threshold value and a density critical threshold value to determine the characteristics of the connected component object to capture a plurality of lamp objects. When the bright object recognition determines that the values of the horizontal distance and vertical distance of any paired connected component objects are smaller than a horizontal distance threshold value and a vertical distance threshold value respectively, then the paired connected component objects are combined to form a lamp object (as shown in FIG. 10). On the other hand, when the values of the horizontal distance and vertical distance of any paired connected component objects are smaller than a horizontal distance threshold value and a vertical distance threshold value respectively, then one of the paired connected component objects is deleted (as shown in FIG. 11).

To facilitate the description of the proposed spatial classification processes, the bright connected components and their groups are firstly defined as follows:

$C_i$ denotes the ith lighting component to be processed.

$CS_k$ denotes the kth set of bright components, $CS_k = \{C_i, i=0, 1, \ldots, p\}$, while the amount of its contained lighting components is denoted as $|CS_k|$.

The locations of a certain component $C_i$ employed in the spatial classification process are their top, bottom, left and right coordinates, denoted as $t_{c_i}$, $b_{c_i}$, $l_{c_i}$, and $r_{c_i}$, respectively.

The width and height of a bright component $C_i$ are denoted as $W(C_i)$ and $H(C_i)$, respectively.

The horizontal distance $D_h$ and the vertical distance $D_v$ between a pair of ith and jth lighting components are defined as, $$D_h(C_i,C_j)=\max(l_{c_i},l_{c_j})-\min(r_{c_i},r_{c_j}) \quad (1)$$

$$D_v(C_i,C_j)=\max(t_{c_i},t_{c_j})-\min(b_{c_i},b_{c_j}) \quad (2)$$

If two bright components are overlapping in the horizontal or vertical direction, then the value of the $D_h(C_i,C_j)$ or $D_v(C_i,C_j)$ will be negative.

Hence, the measures of over lapping between the horizontal and vertical projections of the ith and jth bright components can be respectively computed as, $$P_h(C_i,C_j)=-D_h(C_i,C_j)/\min[W(C_i),W(C_j)] \quad (3)$$

$$P_v(C_i,C_j)=-D_v(C_i,C_j)/\min[H(C_i),H(C_j)] \quad (4)$$

Figure 24:
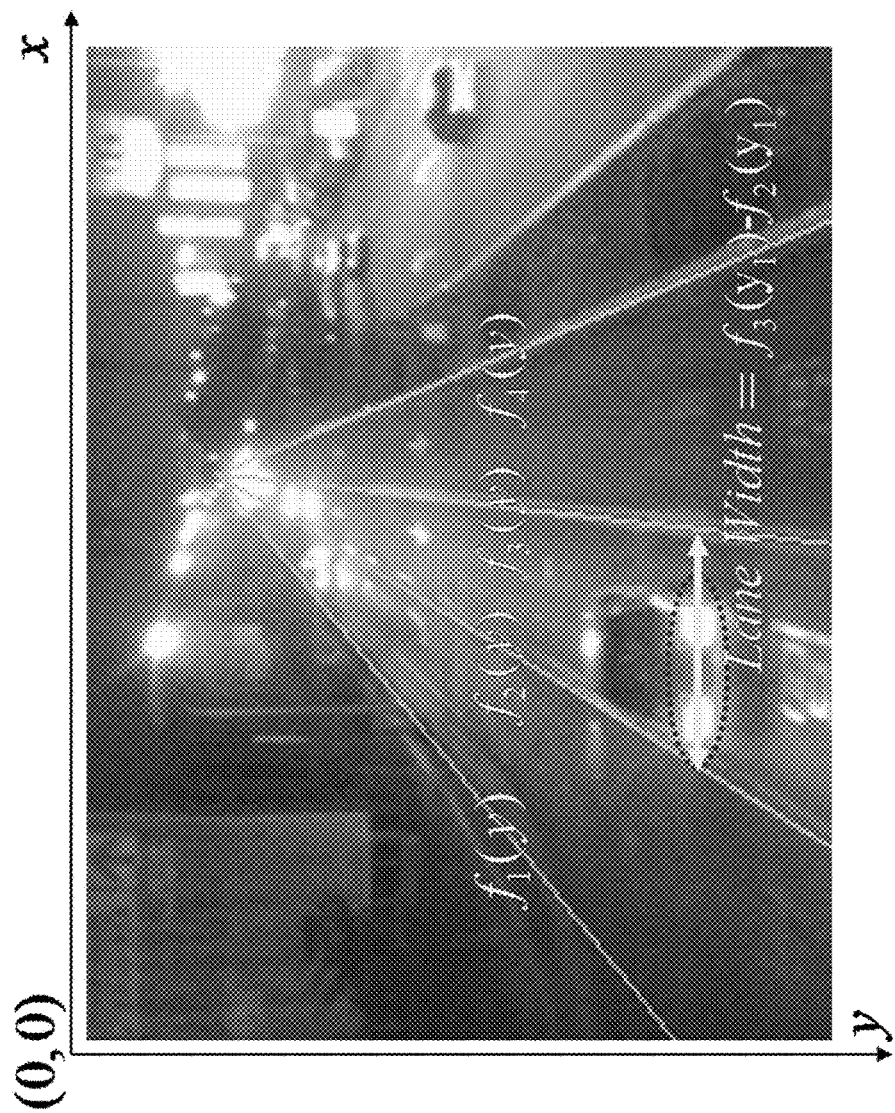
FIG. 24 illustrates the image coordinate system used for vehicle detection.

FIG. 24 illustrates the image coordinate system used for vehicle detection. In this image coordinate system, the vehicles located at a relatively distant place on the road will appear in a higher location and become progressively smaller until converging into a vanishing point. Therefore, the driving lanes stretched from the vanishing point can be modeled by a set of line equations by, $$f_l(y) = \frac{y - c_l}{m_l}; l = 1, 2, \ldots L \quad (5)$$

where y denotes the vertical coordinate; in, and c, are the slope and intercept of the $l_{th}$ driving lane, respectively; and L represents the number of driving lanes. Here, the driving lanes are obtained by using the lane detection method of our in the system initialization process.

The approximate lane width associated with a bright component $C_i$ at a distance on the image coordinate, denoted by $LW(C_i)$, can be obtained by, $$LW(C_i)=|f_{l+1}(C_Y(C_i))-f_l(C_Y(C_i))| \quad (6)$$

where $C_Y(C_i)$ represents the vertical position of the component $C_i$ on the image coordinate, and is defined by $C_Y(C_i)=(t_{c_i}+b_{c_i})/2$.

Based on the above-mentioned definitions of bright components, a preliminary classification procedure can be applied to the obtained bright components to identify potential vehicle light components and filter out most non-vehicle illuminant light components, such as large ground reflectors and beams. For this purpose, a bright component $C_i$ is identified as a potential vehicle light component if it satisfies the following conditions:

Since most vehicle lights have a nearly circular shape, the enclosing bounding box of a potential vehicle light component should form a square shape, i.e. the size-ratio feature of $C_i$ must satisfy the following condition:

$$\tau_{RL} \leq W(C_i)/H(C_i) \leq \tau_{RH} \quad (7)$$

where the thresholds $\tau_{RL}$ and $\tau_{RH}$ for the size-ratio condition are set as 0.8 and 1.2, respectively, to determine the circular-shaped appearance of a potential vehicle light.

A vehicle light object should also have a reasonable area compared to the area of the lane. Thus, the area feature of $C_1$ must satisfy the following condition:

$$\tau_{AL}<A(C_i)<\tau_{AH} \quad (8)$$

where the thresholds $\tau_{AL}$ and $\tau_{AH}$ for the area condition are determined as $\tau_{AL}=(LW(C_i)/8)^2$, and $\tau_{AH}=(LW(C_i)/4)^2$, respectively, to adaptively reflect the reasonable area characteristics of a potential vehicle light.

Accordingly, if two neighboring bright components $C_i$ and $C_j$ satisfy the following conditions, they are categorized as a homogeneous potential vehicle light set and are merged and clustered as a potential vehicle light set CS:

They are horizontally close to each other, i.e., $$D_h(C_i,C_j)<\min W(C_i)W(C_j) \quad (9)$$

They are also vertically close to each other, i.e., $$D_v(C_i,C_j)<2.0 \min H(C_i)H(C_j) \quad (10)$$

Two vertically overlapping bright objects with high horizontal projection profiles should be grouped the same group CS:

$$P_h(C_i,C_j)>T_{hp} \quad (11)$$

where the threshold $T_{hp}$ is chosen as 0.6 to reflect the vertical alignment characteristics of compound vehicle lights.

FIGS. 9 to 11 illustrate the results of the spatial clustering process. This process yields several sets of potential vehicle components CSs in the detection area, and these are labeled as P in the following tracking processes. For example, consider the bottom-right car with a set of compound headlights (marked by a white circle). FIG. 10 shows that its meaningful light components are preliminarily refined and grouped into sets of potential vehicle components, in which the light components of the bottom-right car are grouped into two potential vehicle component sets. This stage also filters out some non-vehicle bright components, such as reflected beams on the ground. FIG. 11 illustrates another sample of the spatial clustering process of bright components, in which the reflections of the headlights of the bottom-right car are excluded from the resulting potential vehicle component sets.

Note that the current stage does not yet merge the vehicle light sets on the two sides of the vehicle body into paired groups. This is because vehicles, which have paired light sets, and motorbikes, which have single light sets, both exist in most nighttime road scenes. Therefore, without motion information in the subsequent frames, it is difficult to determine if the approaching light sets represent paired lights belonging to the same vehicle. Thus, the vehicle light tracking and identification process described in the following section is applied to these potential vehicle light sets to identify actual moving vehicles and motorbikes.

Figure 12:
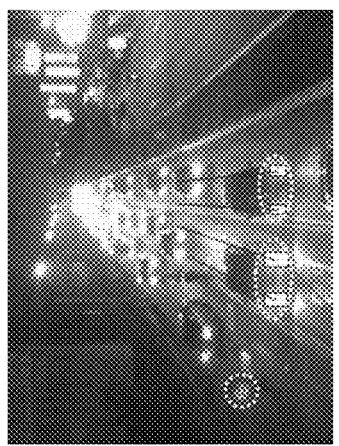
FIG. 12 is a schematic view of a multi-vehicle tracking method of a vehicle tracking method in accordance with a first preferred embodiment of the present invention.
Figure 12:
Figure 13:
FIG. 13 is a schematic view of a multi-vehicle tracking method of a vehicle tracking method in accordance with a second preferred embodiment of the present invention.
Figure 13:
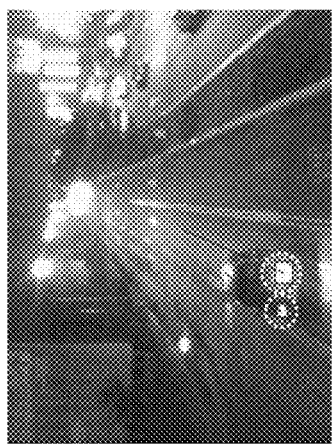

Please refer to FIG. 12, which is a schematic view of a multi-vehicle tracking method of a vehicle tracking method in accordance with a first preferred embodiment of the present invention. The multi-vehicle tracking method tracks the projectory of a lamp object. A single lamp object is used as a basis for tracking a vehicle, and a lamp object is labeled in the images of successive screens. The information of the lamp objects including the traveling direction and position are also tracked and detected to precisely determine the moving direction of each vehicle entering into the screen. The way of using a single lamp object as a basis to track a vehicle can be further used for detecting and tracking a motorcycle (as shown in the right side of FIG. 12) or a vehicle having a single lamp (as shown in FIG. 13).

When a potential vehicle component is initially detected in the detection area, a tracker will be created to associate this potential vehicle component with those in subsequent frames based on spatial-temporal features. The features used in the tracking process are described and defined as follows:

$P_i^t$ denotes the $i^{th}$ potential vehicle component appearing in the detection zone in frame t. The location of $P_i^t$ employed in the tracking process is represented by its central position, which can be expressed by, $$P_i^t = \left[ \frac{l(P_i^t) + r(P_i^t)}{2}, \frac{t(P_i^t) + b(P_i^t)}{2} \right] \quad (12)$$

The tracker $TP_i^t$ represents the trajectory of $P_i$, which has been tracked in sequential frames 1 to t, and is defined as $$TP_i^t = \langle P_i^1, P_i^2, \ldots, P_i^t \rangle \quad (13)$$

The overlapping score of the two potential vehicle components $P_i^t$ and $P_i^{t'}$, detected at two different times t and t', can be computed using their area of intersection:

$$S_o(P_i^t, P_j^{t'}) = \frac{A(P_i^t \cap P_j^{t'})}{\text{Max}(A(P_i^t), A(P_j^{t'}))} \quad (14)$$

In each recursion of the tracking process for a newly incoming frame t, the potential vehicle components appearing in the incoming frame, denoted by $P^t = \{P_i^t | i=1, \ldots, k'\}$, will be analyzed and associated with the set of potential vehicle components tracked in the previous frame t−1, denoted by $TP^{t-1} = \{TP_j^{t-1} | j=1, \ldots, k\}$. The set of tracked potential vehicles $TP^t$ will then be updated according to the following process.

During the tracking process, a potential vehicle component might be in one of three possible tracking states. The component tracking process applies different relevant operations according to the given states of each tracked potential vehicle component in each frame. The tracking states and associated operations for the tracked potential vehicle components are as follows:

Update: When a potential vehicle component $P_i^t \in P^t$ in the current frame matches a tracked potential vehicle component $TP_j^{t-1} \in TP^{t-1}$, then the tracker updates the set of the tracked potential components $TP^t$ by associating $P_i^t$ with the tracker $TP_j^t$ if the following tracker matching condition is satisfied. This matching condition is $$S_o(P_i^t, TP_j^{t-1}) > \tau_{mp} \quad (15)$$

where $\tau_{mp}$ is a predefined threshold that represents the reasonable spatial-temporal coherence for $P_i^t$ to be associated with $TP_j^{t-1}$. For performing under free-flown traffic scenes with sufficiently high frame grabbing rate, i.e. at least 15 frames per second, the movement of a potential component between two subsequent frames will probably be less than its size. Thus, a value of $\tau_{mp} = 0.25$ is experimentally determined to obtain sufficiently intact tracks.

Appear: If a newly appearing potential vehicle component $P_i^t \in P^t$ does not match any $TP_j^{t-1} \in TP^{t-1}$ at the previous time, then a new tracker is created for this potential vehicle component and appended to the updated set $TP^t$.

Disappear: An existing tracker of potential vehicle component $TP_j^{t-1} \in TP^{t-1}$ cannot be matched by any newly coming potential vehicle components $P_i^t \in P^t$. A tracked potential vehicle component may sometimes be temporarily sheltered or occluded in some frames, and will soon re-appear in subsequent frames. Thus, to prevent this vehicle component from being regarded as a newly appearing potential vehicle, its tracker is retained for a span of 0.5 seconds, i.e. 0.5 FPS frames, where FPS denotes the grabbing frame rate (frames per second) of the CCD camera, to appropriately cope with vehicles leaving straightforward or making turns. If a tracker of potential vehicle component $TP_j^{t-1}$ cannot be matched with any potential vehicles $P_i^t \in P^t$ for more than five succeeding frames, then this potential vehicle component is judged to have disappeared and its tracker is removed from the tracker set $TP^t$ in the following frames.

FIGS. 12 and 13 show that, after performing the component tracking process, the potential vehicle components entering the detection area, including cars and motorbikes with different amounts of vehicle lights, are tracked accordingly. These potential component tracks are then analyzed and associated by the following motion-based grouping process.

Figure 14:
FIG. 14 is a schematic view which combines paired lamp objects into a single lamp object in a multi-vehicle tracking method of a vehicle tracking method in accordance with the present invention.

Please refer to FIG. 14, which is a schematic view of combining paired lamp objects into one of the lamp objects in a multi-vehicle tracking method of a vehicle tracking method in accordance with the present invention. When two single lamp objects in successive images show up at the same horizontal position simultaneously, then a process is performed to determine whether or not the vehicles are the same vehicle in order to enter into the combining process: if the values of area, width and horizontal distance of any two of the lamp objects match a lamp area threshold value, a lamp width threshold value and a lamp horizontal distance threshold value, then the multi-vehicle tracking method will combine the paired lamp objects into one of the lamp objects, and track the projectory of the lamp object.

With the tracks of potential vehicle components, the subsequent motion-based grouping process groups potential vehicle components belonging to the same vehicles. For this purpose, potential vehicle components with rigidly similar motions in successive frames are grouped into a single vehicle.

The pairing tracks of nearby potential vehicle components $TP_i^t$ and $TP_j^t$ are determined to belong to the same vehicle if they continue to move coherently and reveal homogeneous features for a period of time. The coherent motion of vehicle components can be determined by the following coherent motion conditions:

They are consistently moving together on the same driving lane for a period of time. First, their spatial motion coherence can be determined by the following spatial coherence criterion, including, $$D_h(TP_i^{t-t}, TP_j^{t-t}) < \frac{LW(TP_i^{t-t}) + LW(TP_j^{t-t})}{2}, \text{ and} \quad (16)$$

$$D_v(TP_i^{t-t}, TP_j^{t-t}) < \frac{(\min H(TP_i^{t-t}) + H(TP_j^{t-t}))}{2}$$

Then, the following lane coherence criterion is used to determine whether or not they are moving on the same given lane:

$$f_l(C_Y(TP_i^{t-t})) < C_X(TP_i^{t-t}) < f_{l+1}(C_Y(TP_i^{t-t})), \text{ and}$$

$$f_l(C_Y(TP_j^{t-t})) < C_X(TP_j^{t-t}) < f_{l+1}(C_Y(TP_j^{t-t})) \quad (17)$$

where l represents the $l^{th}$ driving lane illustrated in FIG. 24; $C_X(TP_i^t)$ denotes the horizontal position of the component $TP_i^t$ on the image coordinate (as $C_Y$ defined for Eq. (6)), and is defined by $C_X(TP_i^t) = (l_{TP_i^t} + r_{TP_i^t})/2$. Here t=0, L, n−1, n is also determined to be the frames of a duration of 0.5 seconds (i.e. 0.5·FPS frames), to properly reflect the sufficient sustained time of their coherent motion information in most traffic flow conditions, including free-flowing and congestion cases.

They have similar heights for a span of time, i.e., $$H(TP_S^{t-\tau})/H(TP_L^{t-\tau}) > T_h \quad (18)$$

where $TP_S^{t-\tau}$ is the one with the smaller height among the two potential vehicle components $TP_i^{t-t}$ and $TP_j^{t-t}$ at the time t–t, while $TP_L^{t-\tau}$ is the larger one. To reasonably reveal the alignment features of paired vehicle lights, $T_h$ is chosen to be 0.6.

Figure 25:
FIG. 25 illustrates the motion-based grouping process on the vehicle component tracks.

If the tracks $TP_i^t$ and $TP_j^t$ meet the above-mentioned coherent motion conditions, they are merged into the same "component group track" of a potential vehicle, denoted by $TG_k^t$. After performing the motion-based grouping process, a set of K component group tracks, denoted by $TG^t = \{TG_k^t | k=1, \ldots, K\}$, which consist of two or more vehicle components, can be obtained for the subsequent tracking process. FIG. 25 illustrates the motion-based grouping process on the vehicle component tracks. In this figure, two headlights of a white car are firstly detected as two potential vehicle components after upon entering the detection area (as shown on the left side of FIG. 25). Two separate trackers for these two potential vehicle components are then created (as shown on the center of FIG. 25), and they are accordingly grouped after they continue to move coherently for a period of time (as shown on the right side of FIG. 25). Notably, as on the right side of FIG. 25, one larger headlight of the following car on the same lane is just detected as a potential vehicle component and tracked. The headlight pair of this car will subsequently be detected, tracked, and grouped as the subsequent car (as depicted in FIG. 18A).

Figure 15:
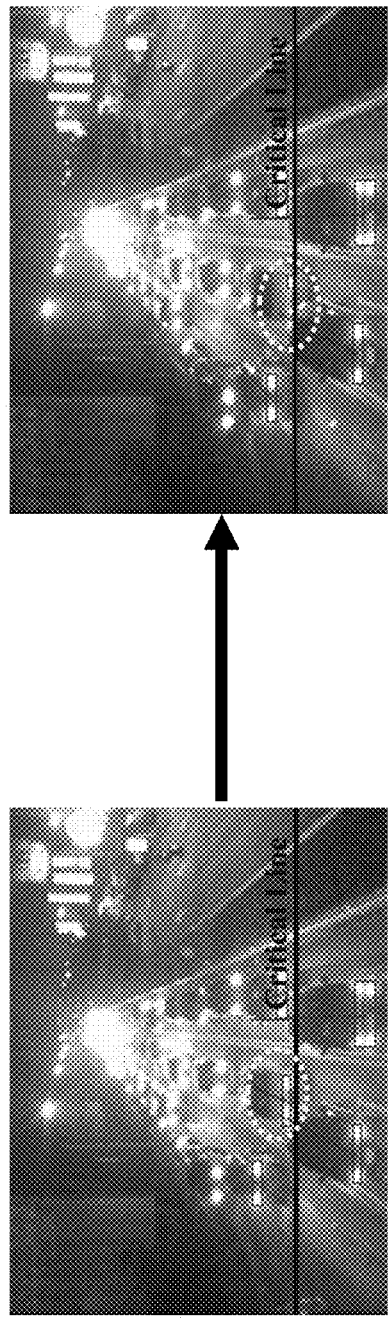
FIG. 15 is a schematic view of tracked potential vehicle components of moving cars with symmetric headlight pairs in a multi-vehicle tracking method of a vehicle tracking method in accordance with a first preferred embodiment of the present invention.
Figure 16:
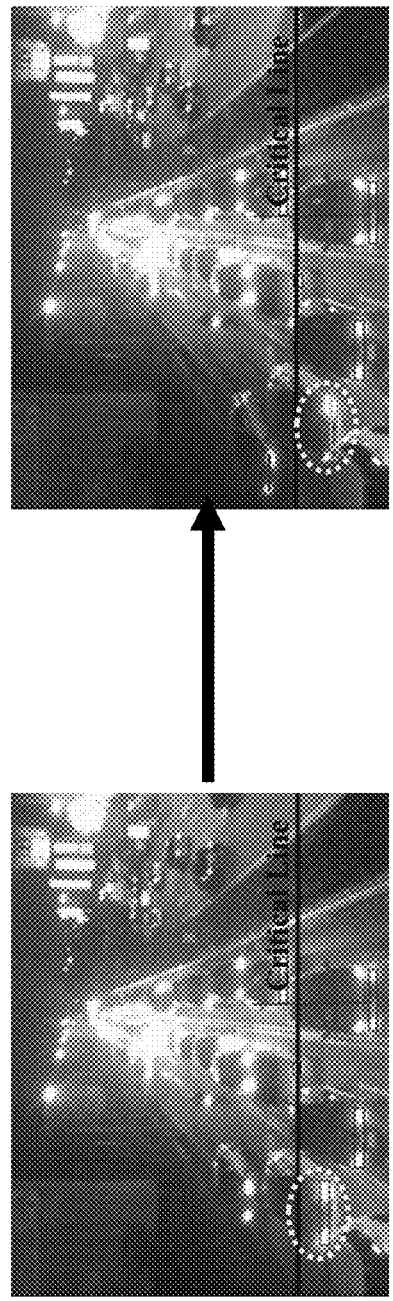
FIG. 16 is a schematic view of tracked potential vehicle components of moving cars with symmetric headlight pairs in a multi-vehicle tracking method of a vehicle tracking method in accordance with a second preferred embodiment of the present invention.

Please refer to FIGS. 15 and 16, which are schematic views of tracking a lamp object trajectory in a multi-vehicle tracking method of a vehicle tracking method in accordance with the first and second preferred embodiment of the present invention respectively. When paired lamp objects are combined into one of the lamp objects to track the projectory of the lamp object, the car at the front may block the lamp of the car that follows. Thus, a critical line is created in the image, and the y-axis coordinate is set to 200 pixels, and the starting point is set at the upper left corner. No compensation is required if the coordinates of the paired connected component objects are smaller than the critical line, and the lamp object is deleted. However, another lamp object will be captured again when the following vehicle is moving (as shown in FIG. 15). On the other hand, although a single lamp is blocked, the paired lamp object is determined to be tracked in a series of images for a period of time. Therefore, a paired connected component object can be used to update the coordinates of the paired lamp object, and the characteristics of the tracked paired lamp object are computed again (as shown in FIG. 16). In addition, if the paired lamp object is determined to be leaving the detection area soon, the paired lamp object will be deleted, and the number of vehicles will be counted.

Figure 17:
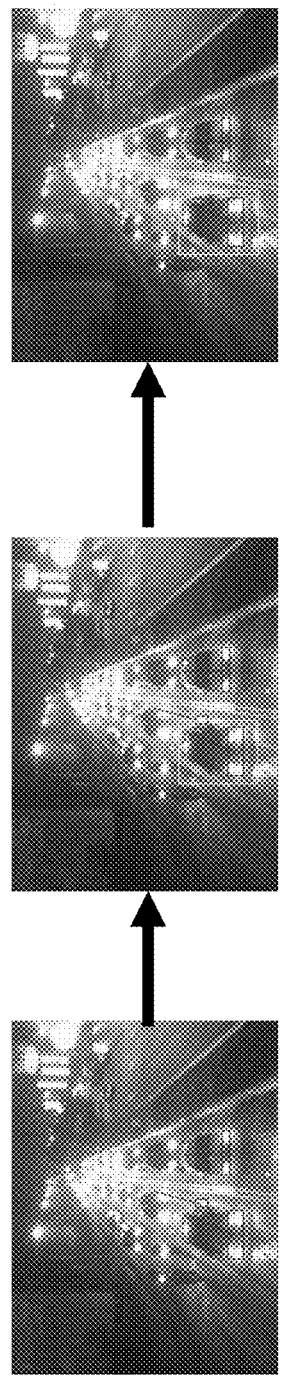
FIG. 17 is a schematic view of the error correction in an a multi-vehicle tracking method of a vehicle tracking method in accordance with the present invention.

With reference to FIG. 17 for a schematic view of correcting errors in a multi-vehicle tracking method in accordance with the present invention, the reflection of a car body and the glare of a road surface will form a single tracking lamp object and cause a wrong detection. To eliminate such error, the present invention makes use of the shape of the lamp object to simulate a virtual frame of the car body. Thus, if the single lamp object exists within the virtual frame, then such lamp object will be treated as a noise and deleted.

Figure 18A:
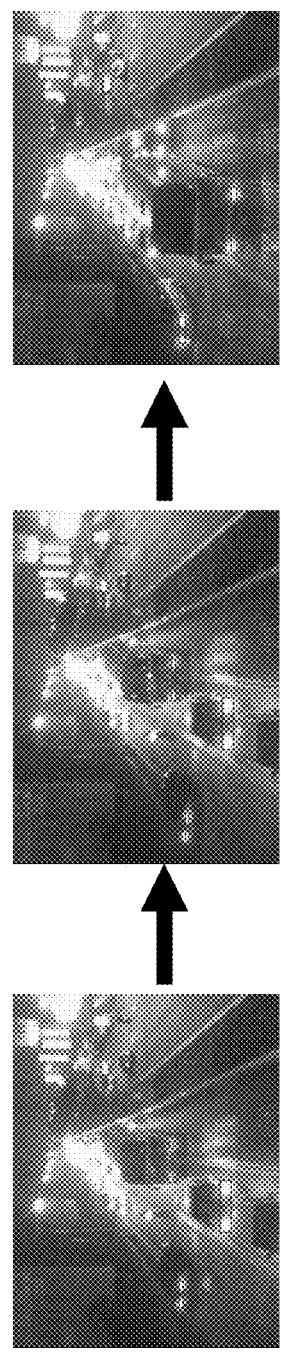
FIG. 18A is a schematic view of tracking large-sized vehicles in a multi-vehicle tracking method of a vehicle tracking method in accordance with the present invention.
Figure 18B:
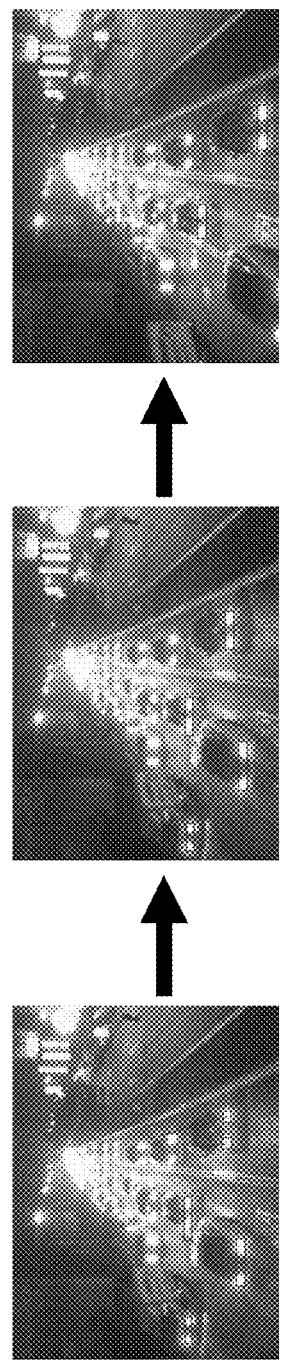
FIG. 18B is a schematic view of tracking small-sized vehicles in a multi-vehicle tracking method of a vehicle tracking method in accordance with the present invention.
Figure 18C:
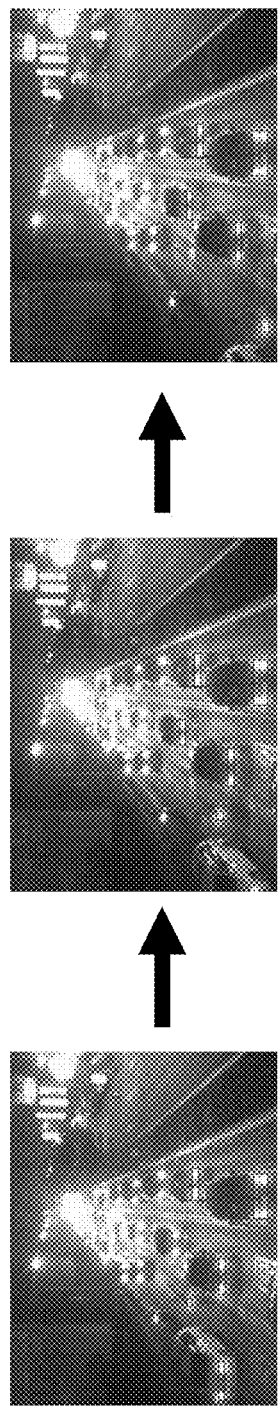
FIG. 18C is a schematic view of tracking motorcycles in a multi-vehicle tracking method of a vehicle tracking method in accordance with the present invention.

Please refer to FIGS. 18A, 18B, and 18C, which are schematic views of tracking various different vehicles in a multi-vehicle tracking method in accordance with the present invention respectively. The present invention tracks a single lamp object, and then uses the projectory of the single lamp to perform the process of combining the lamp objects. The multi-vehicle tracking method then enters into the process of tracking the lamp objects, so that the processes of this series can detect both automobile and motorcycle.

When a potential vehicle represented by a component group is being tracked across the detection area, the segmentation process and the motion-based grouping process can cause some occlusion problems, such as (1) two vehicles simultaneously moving parallel on the same lane are too close to each other (especially large vehicles, such as busses vans or lorries, parallel moving with nearby motorbikes), they may be occluded for a while, because this may not be completely avoided in the spatial coherence criterion based on the lane information during the motion-based grouping process; and (2) some large vehicles may have multiple light pairs, and therefore may not be immediately merged into single groups during the motion-based grouping process. Therefore, using the potential vehicle tracks of component groups $TG_k^t \in TG^t$ obtained by the motion-based grouping process, the component group tracking process can update the position, motion, and dimensions of each potential vehicle. This process progressively refines the detection results of potential vehicles using spatial-temporal information in sequential frames. This subsection describes the tracking process for component groups of potential vehicles, which handles the above-mentioned occlusion problems.

First, the possible location of each tracked component group of a potential vehicle in the current frame t will be preliminarily estimated by an adaptive search window based on motion information from the previous frame. To rapidly determine the search window of a tracked vehicle component group, its motion vector is firstly computed as, $$\Delta x_k^{t-1} = C_X(TG_k^{t-1}) - C_X(TG_k^{t-2})$$

$$\Delta y_k^{t-1} = C_Y(TG_k^{t-1}) - C_Y(TG_k^{t-2}) \quad (19)$$

where $C_X(TG_k^t)$ and $C_Y(TG_k^t)$ respectively represent the horizontal and vertical positions of the tracked component group $TG_k^t$ on the image coordinate, and are defined by $C_X(TG_k^t) = (l_{TG_k^t} + r_{TG_k^t})/2$, and $C_Y(TG_k^t) = (t_{TG_k^t} + b_{TG_k^t})/2$, respectively. A displacement factor $(w_1, w_2)$, which reflects the possible position of the potential vehicle in the current frame, can then be respectively computed as, $$w_1 = 1 + \frac{\Delta x_k^{t-1}}{\|\Delta x_k^{t-1}, \Delta y_k^{t-1}\|}$$

$$w_2 = 1 + \frac{\Delta y_k^{t-1}}{\|\Delta x_k^{t-1}, \Delta y_k^{t-1}\|} \quad (20)$$

where $\|\Delta x_k^{t-1}, \Delta y_k^{t-1}\|$ indicates the Euclidian distance between $TG_k^{t-1}$ and $TG_k^{t-2}$. The center of the search window of a tracked potential vehicle in the current frame can then be determined as $(w_1 \times C_X(TG_k^{t-1}), w_2 \times C_Y(TG_k^{t-1}))$, and its width and height can be defined as $1.5 \times W(TG_k^{t-1})$ and $3 \times H(TG_k^{t-1})$, respectively.

Accordingly, the possible positions of tracked potential components $TP_i^t$, which are matched with a tracked potential component group $TG_k^t$ in the current frame, can be more rapidly and correctly obtained in the search window. A tracked component group $TG_k^t$ appearing in the search window may be in one of four possible states associated with its own component tracks $TP_i^t, \ldots, TP_{i+n}^t$. This potential vehicle tracking process conducts different operations according to the current state of $TG_k^t$:

Update: All of the grouped component tracks $TP_i^{t-1}, \ldots, TP_{i+n}^{t-1}$ owned by a tracked component group $TG_k^{t-1}$ in the previous frame still exactly and respectively match a set of vehicle component tracks $TP_{i\phi}^t, \ldots, TP_{i\phi+n}^t$ in the current frame within the search window. In other words, they all satisfy the following group matching condition:

$$S_o(TP_i^t, TG_k^{t-1}) > \tau_{mg} \quad (21)$$

The vehicle tracker then updates the component group $TG_k^t$ of a potential vehicle to include the renewed group of $TP_{i\phi}^t, \ldots, TP_{i\phi+n}^t$. Here, the threshold $\tau_{mg}$ reflects a reasonable spatial-temporal coherence confirmation for $TP_{i\phi}^t, \ldots, TP_{i\phi+n}^t$ to be continuously associated with the same group as $TG_k^{t-1}$. Like the tracker matching condition in Eq. (15), for efficient performance under free-flowing traffic scenes with at least a 15 fps frame grabbing rate, $\tau_{mg}$ should be reasonably firmer than the value of tracker matching criterion parameter $\tau_{mp}$ in Eq. (15). This will ensure that the updated $TG_k^t$, is sufficiently coherent with the associated group of $TP_{i\phi}^t, \ldots, TP_{i\phi n}^t$. Thus, the value of $\tau_{mg} = 0.5$ is experimentally chosen to obtain adequately intact track groups.

Shelter/Absorb: the grouped component tracks $TP_i^{t-1}, \ldots, TP_{i+n}^{t-1}$ owned by $TG_k^{t-1}$ in the previous frame now have fewer component tracks $TP_{i\phi}^t, \ldots, TP_{i\phi+m}^t$ (where m<n) in the current frame within the search window. The group matching condition (Eq. (21)) of the component group $TG_k^{t-1}$ with $TP_{i\phi}^t, \ldots, TP_{i\phi+m}^t$ will be respectively checked, and the component tracks that satisfy the matching condition will remain associated with the renewed $TG_k^t$. The tracks of unexpectedly disappeared or absorbed components missing from $TG_k^t$ are retained in the $TG_k^t$ until they are regarded as disappeared components and removed by the potential vehicle component tracking process.

Extend/Split: The grouped component tracks $TP_i^{t-1} \ldots TP_{i+n}^{t-1}$ owned by $TG_k^{t-1}$ in the previous frame are now extended or split into more component tracks $TP_{i\phi}^t, \ldots, TP_{i\phi+m}^t$ (where m>n) in the current frame within the search window. The group matching condition (Eq. (21)) of $TG_k^{t-1}$ with $TP_{i\phi}^t, \ldots, TP_{i\phi+m}^t$ will be respectively checked, and the component tracks which coincide with $TG_k^{t-1}$ will remain associated with the renewed $TG_k^t$. The tracks of newly-appearing or split components are not matched with $TG_k^{t-1}$, and the motion-based grouping process (Eqs. (16)-(18)) will be applied to these non-matched component tracks to determine if they have coherent motion property with $TG_k^{t-1}$. The component tracks that having coherent motion will be assigned to the updated $TG_k^t$, and the others will be detached as orphan component tracks.

Exit: Once a tracked potential component group $TG_k^t$ has moved across the boundary of the detection area, the potential vehicle component tracking process determines that all of its component tracks have disappeared.

According to the examples in FIG. 25, FIG. 18A presents examples of the potential vehicles analyzed by the component group tracking process. In this example, two headlights of a bus are firstly detected and tracked as two separate potential vehicle components after entering the detection area (as on the left side of FIG. 18A). They are then merged into a component group by the motion-based grouping process (as on the center of FIG. 18A), and its component group is accordingly tracked as a potential vehicle (as shown on the right side of FIG. 18A). After the potential vehicles are tracked for a certain time, the following verification and classification process is performed on these tracked potential vehicles to identify the actual vehicles and their associated types.

After a vehicle is tracked, a single lamp object and a set of lamp object pair are obtained. These tracked objects are determined if there exists characteristics of the lamp. The external appearance of the lamp object of an automobile should be substantially in a rectangular shape. Since the lamps are generally installed on both sides in front of the vehicles, the projected shape should be substantially in a rectangular shape. Additionally, the external appearance of a single lamp object of a motorcycle is substantially in a square shape. In summary, the vehicle detection/recognition compares the aspect ratio of a lamp object or a set of lamp object pairs with the aspect ratio threshold value of an automobile and a motorcycle. The vehicle detection/recognition also determines the type of a vehicle which includes the lamp object according to the comparison result. In the embodiments of the invention, the aspect ratio threshold value of an automobile and a motorcycle can be 2.0 and 0.8, respectively.

Regardless of the motorcycle lamp or the automobile lamp, the lamp must exist on the road in successive images, so that if the lamp object or lamp objects are overlapped continuously for more than 10 times, then the lamp object and the set of lamp objects are considered as candidate motorcycles and automobiles. If the coordinates exceed the range of the image, then the lamp object and lamp objects will be identified as a motorcycle or an automobile and the number of motorcycles or automobiles is counted.

To identify motorbikes, the fact is adopted that a motorbike usually appears as a single, and nearly square-shaped or vertical rectangular-shaped lighting component in nighttime traffic scenes. Thus, a single tracked component $TP_i^t$ which has not been associated to any component groups and been consistently and alone tracked by the vehicle component tracking process for a significant span of more than 1 second, i.e. 1.0·FPS frames, can be identified as a moving motorbike candidate. Therefore, if a single tracked component $TP_i^t$ is actually a motorbike, then the size-ratio feature of its enclosing bounding box should reflect a square or vertical rectangular shape, and should satisfy the following discriminating rule:

$$\tau_{m1} \leq W(TP_i^t)/H(TP_i^t) \leq \tau_{m2} \quad (22)$$

where the threshold $\tau_{m1}$ and $\tau_{m2}$ on the size-ratio condition are selected as 0.6 and 1.2, respectively, to suitably identify the shape appearance characteristic of the motorbikes, which are obviously different from those of the cars.

The above-mentioned discriminating rules can be obtained by analyzing many experimental videos of real nighttime traffic environments, in which vehicle lights appear in different shapes and sizes, and move in different directions at different distances. The thresholds values utilized for these discriminating rules were determined to yield good performance in most general cases of nighttime traffic scenes.

A tracked component group or single potential component of a potential vehicle will be identified and classified as an actual car or a motorbike based on the above-mentioned vehicle classification rules. When a classified vehicle leaves the detection area, the count of its associated vehicle type is then incremented and recorded to update the traffic flow information. Thus, each detected vehicle is guaranteed to be counted once, and the redundant counting of vehicles can be efficiently avoided.

Figure 19:
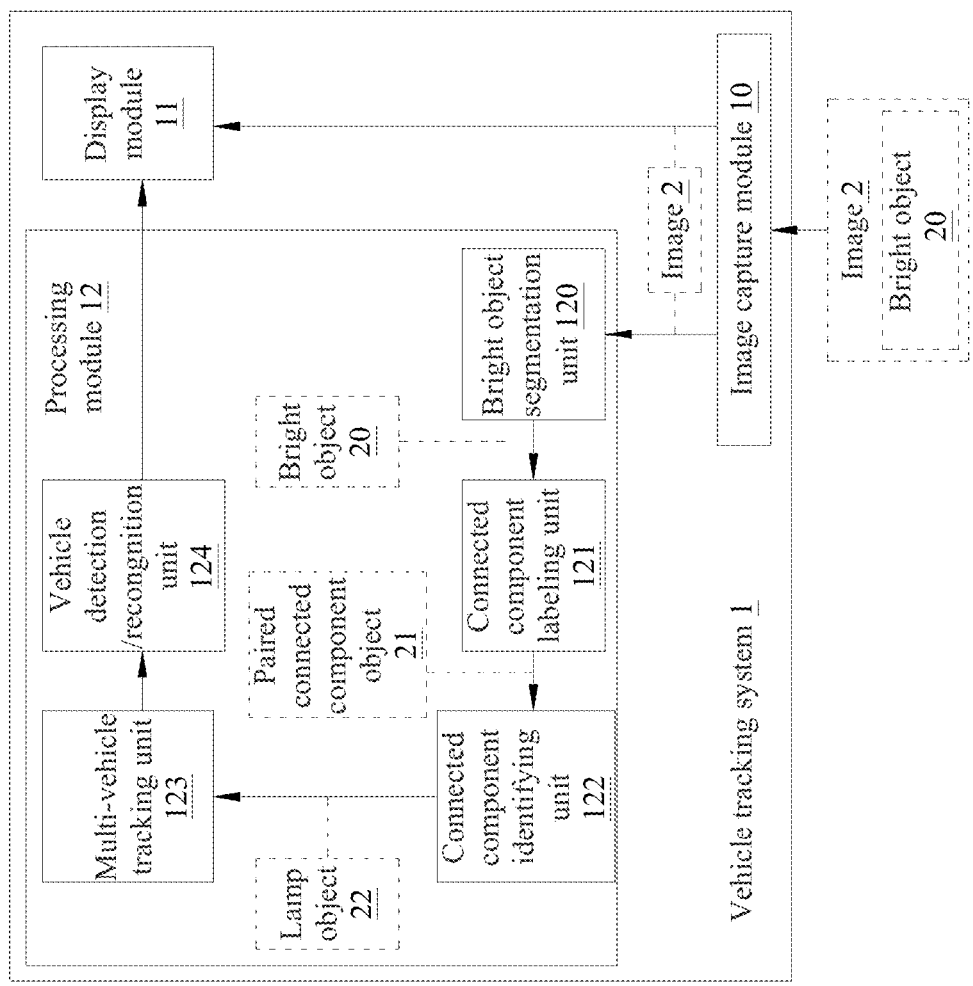
FIG. 19 is a block diagram of a vehicle tracking system of the present invention.

With reference to FIG. 19 for a block diagram of a vehicle tracking system of the present invention, the vehicle tracking system 1 (DSP-based real-time system) comprises an image capture module 10, a display module 11 and a processing module 12. The image capture module 10 is provided for capturing an image 2, and the display module 11 is provided for displaying the image 2. The processing module 12 comprises a bright object segmentation unit 120, a connected component object labeling unit 121, a bright object identifying unit 122, a multi-vehicle tracking unit 123 and a vehicle identifying unit 124. The bright object segmentation unit 120 is provided for capturing a plurality of bright objects 20 from the image 2. The connected component object labeling unit 121 is provided for labeling the coordinates of the bright object 20 to form a plurality of paired connected component objects 21. The bright object identifying unit 122 is provided for identifying, analyzing and combining the characteristics of the connected component object 21 to form a plurality of lamp objects 22. The multi-vehicle tracking unit 123 is provided for tracking the trajectory of the lamp objects 22. The vehicle identifying unit 124 is provided for identifying the type of a vehicle having the lamp object 22. The processing module 12 further counts the number of various vehicles, and then controls the display module 11 to display various vehicles. The operation of each element has been described in details in the aforementioned vehicle tracking method, and thus will not be described here again.

This section describes the implementation of the proposed vehicle detection, tracking and classification system on a DSP-based real-time system. The real-time vision system was implemented on a TI DM642 DSP-based embedded platform, operated at 600 MHz with 32 MB DRAM, and set up on elevated platforms near highways and urban roads.

Initially, the detection area for each traffic scene was first determined using a lane detection process. The detection area was located along the midline of the traffic scene image, and bounded by the most left and right lane boundaries (as shown in FIG. 7), and divided into driving lanes (as show in FIG. 24). To make the system operate well, the CCD camera should be set up on an elevated platform with a sufficient height to capture an appropriate region for covering all the driving lanes to be monitored, and the view angles of the CCD camera should be adjusted to be oriented to the monitored region for suitably obtaining the reliable and clear features of vehicle lights. The frame rate of this vision system is 30 true-color frames per second, and each frame in the grabbed image sequences measures 320 pixels by 240 pixels. The computation required to process one input frame depends on traffic scene complexity. Most of the computation time is spent on the connected-component analysis and the spatial clustering process of lighting objects. For an input video sequence with 320×240 pixels per frame, the proposed real-time system takes an average of 26.3 milliseconds to process each frame on the 600 MHz TI-DM642 DSP-based embedded platform. This minimal computation cost ensures that the proposed system can effectively satisfy the demand of real-time processing at more than 30 frames per second.

Figure 20:
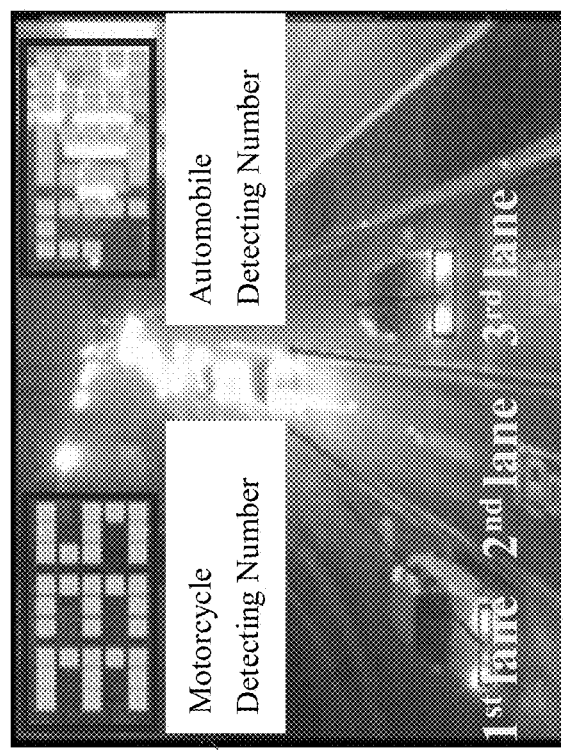
FIG. 20 is a schematic view of a vehicle tracking system and method in accordance with the present invention.

The system was operated on several videos of real nighttime highway and urban traffic scenes in various traffic conditions at Taiwan. FIG. 20 shows that the proposed system counts the numbers of detected cars and motorbikes appearing in each driving lane of the detection area, and displays the number of detected cars on the top-right of the screen, and the amount of detected motorbikes on the top-left.

For the quantitative evaluation of vehicle detection performance, the present invention adopts the Jaccard coefficient, which is commonly used for evaluating performance in information retrieval. This measure is defined as:

$$J = \frac{T_p}{T_p + F_p + F_n} \quad (23)$$

where $T_p$ (true positives) represents the number of correctly detected vehicles, $F_p$ (false positives) represents the number of falsely detected vehicles, and $F_n$ (false negatives) is the number of missed vehicles. The present invention determines the Jaccard coefficient J for the vehicle detection results of each frame of the traffic video sequences by counting the number of correctly detected vehicles, falsely detected vehicles, and missed detections of vehicles in each frame. The average value of the Jaccard coefficients J was then obtained from all frames of the video sequences by $$\bar{J} = \Sigma_N J/N \quad (24)$$

where N is the total number of video frames. Here, the ground-truth of detected vehicles was obtained by manual counting.

With reference to FIG. 20 for a schematic view of a vehicle tracking system and method in accordance with the present invention, the vehicle tracking system performs an instant test at the junction of Ci Yun Road and on Kuang Fu Road of Hsinchu, and integrates the test directly into the present close-circuit television (CCTV) system installed at each road junction and each highway in Taipei. From the results of the actual tests, the present invention can be applied for the CCTV image directly without making any change, while maintaining the same detection accuracy and the experiment result of each road section elaborated sequentially as follows. The lanes in each image is numbered sequentially from left to right as first lane, second lane, third lane and fourth lane, and the number at the upper left corner of an image indicates the number of motorcycles detected by the method of the present invention, and the number at the upper right corner of the image indicates the number of detected automobiles.

Figure 21:
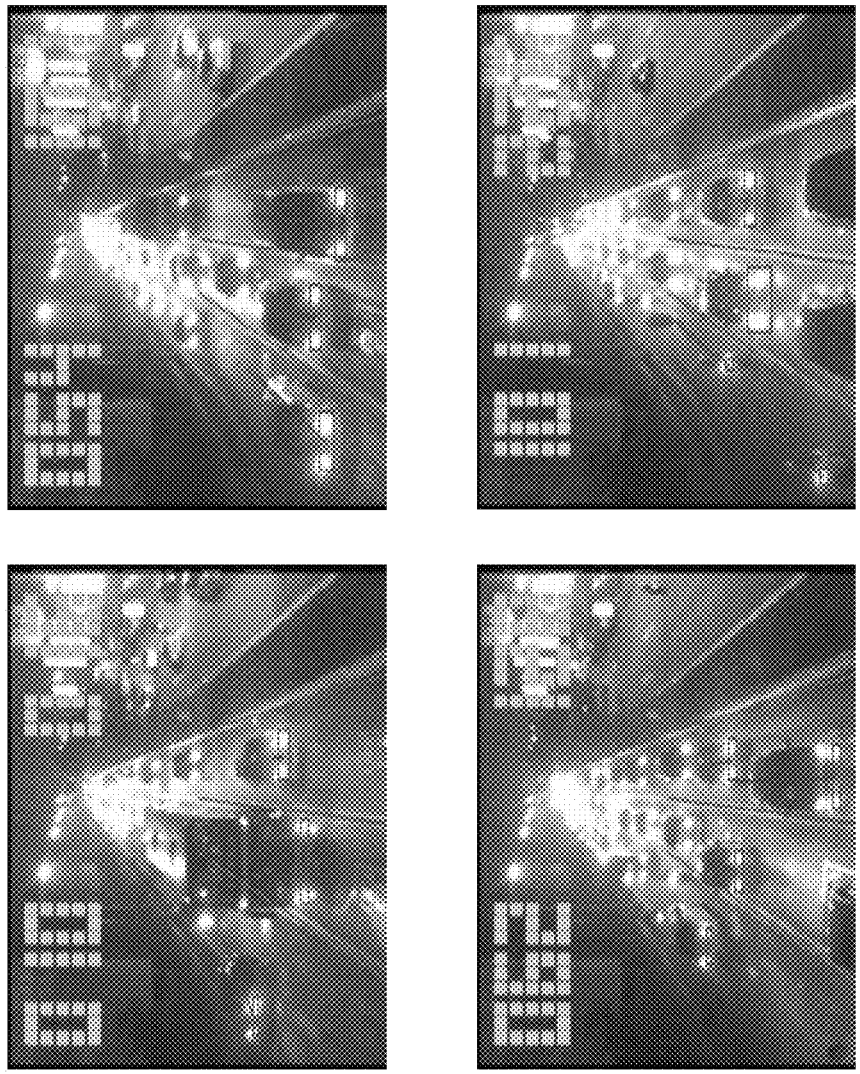
FIG. 21 is a schematic view which applies the vehicle tracking system and method at the junction of Ci Yun Road of Hsinchu in accordance with the present invention.

With reference to FIG. 21 for a schematic view of applying the vehicle tracking system and method at the junction of Ci Yun Road of Hsinchu in accordance with the present invention, the test was taken at a road junction, where traffic signal lights are provided for controlling the traffic flow, and thus a vehicle may be in a motion-to-still state or a still-to-motion state, and a good detection rate can be achieved in both states, wherein the images include large-size cars, small-size cars, and motorcycles. Besides, there are many vehicles making a right turn at the first lane, and the right-turning vehicles are not restricted by the red light, so that the traffic flow of the first lane is obviously heavier than those of the second and third lanes.

FIG. 21 shows a sample of a complicated traffic scene from a nighttime urban road at rush hour under a bright environmental illumination condition. Due to traffic signal changes, the vehicles, including large and small cars, and motorbikes, stop and move intermittently. As shown in FIG. 21, most of these cars and motorbikes are correctly detected, tracked, and classified, although many non-vehicle illuminating objects, such as street lamps, reflected beams, and road reflectors on the ground appear very close to the lights of the detected vehicles. Moreover, as depicted on the right top and right down side of FIG. 21, most vehicles driving very close to nearby lanes are also successfully discriminated and detected. Table 1 shows the data of the approach on vehicle detection and tracking for the traffic scene of FIG. 21. Notably, in this traffic scene, many cars and motorbikes are mixed and closely co-moved (especially in the 1st lane), and many cars and motorbikes intending to turn right also drive in the 1st lane. Although this lane has more complicated traffic flow patterns and vehicle features than the other two lanes, and causes a few more misdetections than the other two lanes, the proposed system still appropriately detected and classified most of the moving cars and motorbikes.

TABLE 1

Experimental data of the vehicle detection and tracking
of the traffic scene on the urban road scene in FIG. 21

| Lane | Detected Vehicles | Actual Vehicles |
|---|---|---|
| Lane 1 | 921 | 969 |
| Lane 2 | 292 | 300 |
| Lane 3 | 228 | 233 |
| Total No. Cars | 887 | 909 |
| Total No. Motorbikes | 584 | 593 |
| Detection Score J of Cars | 97.58% | |
| Detection Score J of Motorbikes | 98.48% | |
| Time span of the video | 50 minutes | |

Figure 22:
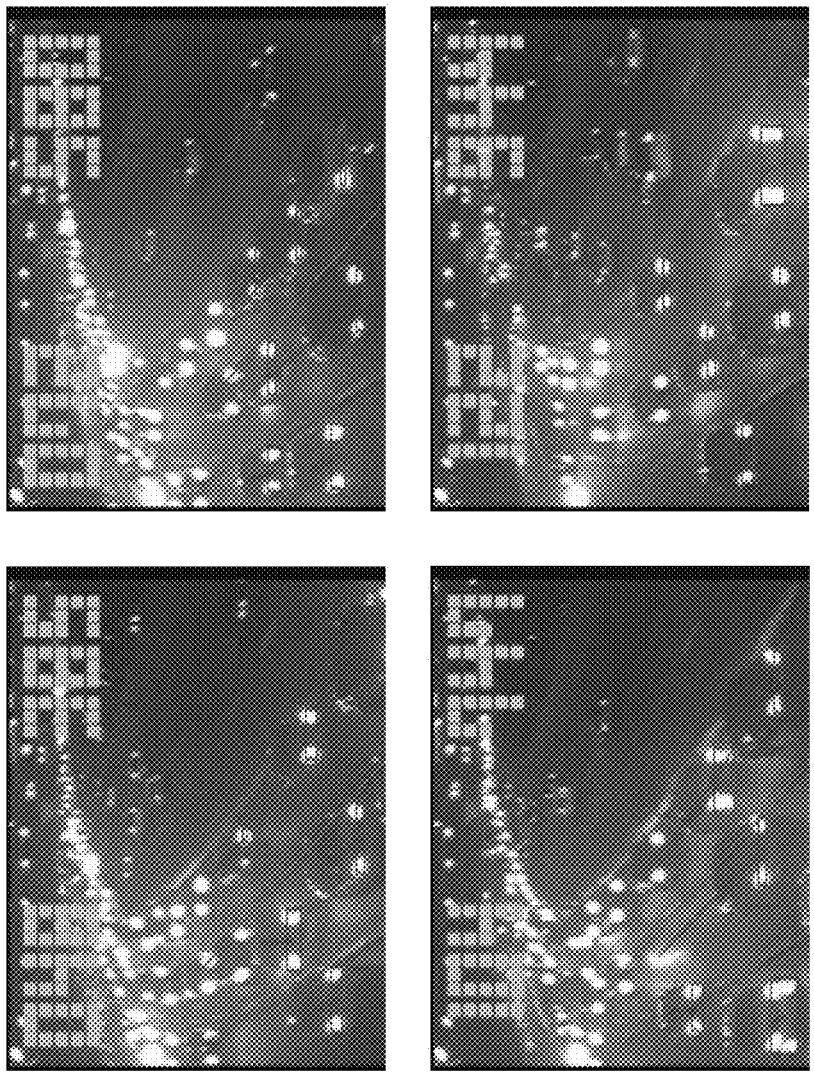
FIG. 22 is a schematic view which applies the vehicle tracking system and method at the intersection of Chien Kuo South Road and Zhongxiao East Road flyover of Taipei in accordance with the present invention.

With reference to FIG. 22 for a schematic view of applying the vehicle tracking system and method at the intersection of Chien Kuo South Road and Zhongxiao East Road flyover of Taipei in accordance with the present invention, the traffic is jammed in this road section and the traffic flow is heavy. Since there are no traffic lights in this road section, almost all vehicles are moving very slowly, and the numbers of vehicles in the three lanes are almost the same.

FIG. 22 discloses another experimental scene of a congested nighttime highway at rush hour under a light environmental illumination condition. These images were obtained by a closed-loop television (CCTV) camera. Since motorbikes are not allowed to drive on highways in Taiwan, only cars appeared in this highway traffic scene. This figure shows that even though multiple vehicles are stopped or moving slowly close to each other in this congested traffic scene, the proposed method still successfully detects and tracks almost all vehicles. Table 2 shows the quantitative results of the proposed approach for vehicle detection on a nighttime highway. Due to the unsatisfactory view angle of the CCTV camera, the $1^{st}$ lane is partially occluded. Thus, the vehicle light sets of some few detected cars may be occluded and misclassified as single-light motorbikes. However, this does not significantly influence the determination of typical traffic flow parameters, including congestion, throughput, and queue length.

TABLE 2

Experimental data of the vehicle detection
on a nighttime highway scene in FIG. 22

| Lane | Detected Vehicles | Actual Vehicles |
|---|---|---|
| Lane 1 | 1392 | 1428 |
| Lane 2 | 1527 | 1535 |
| Lane 3 | 1495 | 1536 |
| Total No. Cars | 4397 | 4499 |
| Detection Rate J of Cars | 97.73% | |
| Time span of the video | 50 minutes | |

Figure 23:
FIG. 23 is a schematic view of applying the vehicle tracking system and method in the section of Kuang Fu Road of Hsinchu in accordance with the present invention.

With reference to FIG. 23 for a schematic view of applying the vehicle tracking system and method in the section of Kuang Fu Road of Hsinchu in accordance with the present invention, this road section has four lanes. Since the test was taken at night, the traffic flow is light and the traffic speed is fast, and vehicles are moving non-stop, and these vehicles include large-size cars, small-sized cars, and motorcycles. In this environment, the angle or height of the installed camera will be the best regardless of the location where the camera is installed.

FIG. 23 is a nighttime urban traffic scene with a dark environmental illuminated condition and low traffic flow. As shown in FIG. 23, although non-vehicle illuminating objects and reflected beams on the ground coexist with the vehicle in this scene, the proposed system correctly detected and tracked nearly all moving cars and motorbikes on a free-flowing urban road by locating, grouping, and classifying their vehicle lights. However, a few detection errors occurred when some cars with broken (single) headlights were misclassified as motorbikes. Table 3 depicts the quantitative results of the proposed approach for vehicle detection and tracking on this urban road.

TABLE 3

Experimental data of the vehicle detection and
tracking on the urban road scene in FIG. 23

| Lane | Detected Vehicles | Actual Vehicles |
|---|---|---|
| Lane 1 | 131 | 137 |
| Lane 2 | 111 | 113 |
| Lane 3 | 67 | 69 |
| Lane 4 | 36 | 36 |
| Total No. Cars | 163 | 165 |
| Total No. Motorbikes | 184 | 190 |
| Detection Score J of Cars | 98.79% | |
| Detection Score J of Motorbikes | 96.84% | |
| Time span of the video | 20 minutes | |

In summary, the vehicle tracking system and method of the present invention can seperate out lamp images for a later image processing, and single lamp is used as a basis for tracking a multiple of lamps. Thus, the present invention can improve the accuracy of detecting vehicles at night time and overcome the difficulty of identifying the vehicles at night.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A vehicle tracking method, comprising the steps of: capturing a plurality of bright objects from an image by the bright object segmentation; labeling coordinates of the plurality of bright objects by a connected component object labeling method to form a plurality of connected component objects; identifying, analyzing and combining characteristics of the plurality of connected component objects by the bright object recognition to form a plurality of lamp objects; and identifying the type of a vehicle having the plurality of lamp objects by vehicle detection/recognition, and counting the number of various vehicles;

wherein the bright object recognition respectively compares values of the aspect ratio, area and density of the plurality of connected component objects with a maximum aspect ratio threshold value, a minimum aspect ratio threshold value, a maximum area threshold value, a minimum area threshold value and a density critical threshold value to determine the characteristics of the plurality of connected component objects to capture the plurality of lamp objects; and if the bright object recognition determines that any two of the connected component objects have a horizontal distance and a vertical distance smaller than a horizontal distance threshold value and a vertical distance threshold value respectively, then the paired connected component objects are combined to form a lamp object.

2. The vehicle tracking method of claim 1, wherein the image is a grey-scale image, and the bright object segmentation determines a plurality of threshold values by a grey scale statistical chart of the grey-scale image, and segments the image to form the plurality of bright objects after objects with same nature and similar characteristics in the grey-scale image are determined according to the plurality of threshold values.

3. The vehicle tracking method of claim 1, wherein the image includes a plurality of lanes that defines a detection area, and the connected component object labeling method includes a coarse scan and a fine scan, for labeling the plurality of adjacent bright objects as the same object by a connected component labeling method to form the plurality of connected component objects.

4. The vehicle tracking method of claim 1, wherein the multi-vehicle tracking method tracks the projectory of the plurality of lamp objects; and if the values of area, width and horizontal distance of any paired lamp objects match a lamp area threshold value, a lamp width threshold value and a lamp horizontal distance threshold value respectively, the multi-vehicle tracking method combines the paired lamp object into one of the lamp objects, and tracks the projectory of the lamp object.

5. The vehicle tracking method of claim 1, wherein the vehicle detection/recognition compares the aspect ratio of the plurality of lamp objects with an aspect ratio threshold value of a motorcycle and an aspect ratio threshold value of an automobile, and determines the type of a vehicle having the plurality of lamp objects according a comparison result.

6. A vehicle tracking system, comprising:
an image capture module, for capturing an image;
a display module, for displaying the image; and
a processing module, comprising:
a bright object segmentation unit, for capturing a plurality of bright objects from an image;
a connected component, for labeling coordinates of the plurality of bright objects by object labeling unit to form a plurality of connected component objects;
a bright object identifying unit, for identifying, analyzing and combining characteristics of the plurality of connected component objects;
a multi-vehicle tracking unit, for tracking a trajectory of the plurality of lamp objects; and
a vehicle identifying unit, for identifying the type of a vehicle having the plurality of lamp objects;

the processing module further counting the number of various vehicles to control the number of various vehicles displayed by the display module;
wherein the bright object identifying unit respectively compares the values of aspect ratio, area and density of the plurality of connected component objects with a maximum aspect ratio threshold value, a minimum aspect ratio threshold value, a maximum area threshold value, a minimum area threshold value and a density critical threshold value to determine the characteristics of the plurality of connected component objects to capture the plurality of lamp objects; and if the bright object recognition determines that any two of the connected component objects have a horizontal distance and a vertical distance smaller than a horizontal distance threshold value and a vertical distance threshold value respectively, then the paired connected component objects are combined to form a lamp object.

7. The vehicle tracking system of claim 6, wherein the image is a grey-scale image, and the bright object segmentation unit determines a plurality of threshold values by a grey scale statistical chart of the grey-scale image, and segments the image to form the plurality of bright objects after objects of the same nature and similar characteristics in the grey-scale image are determined according to the plurality of threshold values.

8. The vehicle tracking system of claim 6, wherein the image includes a plurality of lanes that defines a detection area, and the connected component object labeling method includes a coarse scan and a fine scan for labeling the plurality of adjacent bright objects as the same object by a connected component labeling method to form the plurality of connected component objects.

9. The vehicle tracking system of claim 6, wherein the multi-vehicle tracking unit tracks the projectory of the plurality of lamp objects; and if the values of area, width and horizontal distance of any paired lamp objects match a lamp area threshold value, a lamp width threshold value and a lamp horizontal distance threshold value respectively, the multi-vehicle tracking method combines the paired lamp objects into one of the lamp objects, and tracks the projectory of the lamp object.

10. The vehicle tracking system of claim 6, wherein the vehicle identifying unit compares the aspect ratio of the plurality of lamp objects with an aspect ratio threshold value of a motorcycle and an aspect ratio threshold value of an automobile, and determines the type of a vehicle having the plurality of lamp objects according a comparison result.

* * * * *